United States Patent
Cordeiro

(10) Patent No.: US 10,412,636 B2
(45) Date of Patent: *Sep. 10, 2019

(54) CHANNEL MANAGEMENT FOR AN ENHANCED DIRECTIONAL MULTI-GIGABIT STATION

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/862,186

(22) Filed: Jan. 4, 2018

(65) Prior Publication Data

US 2018/0184333 A1  Jun. 28, 2018

Related U.S. Application Data

(63) Continuation of application No. 14/911,997, filed as application No. PCT/US2013/074153 on Dec. 10, 2013, now Pat. No. 9,872,206.

(Continued)

(51) Int. Cl.
*H04W 4/00* (2018.01)
*H04W 28/20* (2009.01)
(Continued)

(52) U.S. Cl.
CPC ......... *H04W 28/20* (2013.01); *H04W 40/244* (2013.01); *H04W 72/0453* (2013.01); *H04W 72/04* (2013.01)

(58) Field of Classification Search
CPC .... H04W 40/244; H04W 28/20; H04W 72/04
See application file for complete search history.

(56) References Cited

U.S. PATENT DOCUMENTS 9,872,206 B2  1/2018 Cordeiro
2010/0074190 A1  3/2010 Cordeiro et al.
(Continued)

FOREIGN PATENT DOCUMENTS

CN  101156421 A  4/2008
CN  102932879 A  2/2013
(Continued)

OTHER PUBLICATIONS

"Amendment 3: Enhancements for Very High Throughput in the 60 GHz Band", IEEE P802.11ad/D5D6.00 Part 11: Wireless LAN Medium Access Control (MAC) and Physical Layer (PHY) Specifications-, (Mar. 2012), 8 pgs.
(Continued)

*Primary Examiner* — Shukri Taha
(74) *Attorney, Agent, or Firm* — Schwegman Lundberg & Woessner, P.A.

(57) ABSTRACT

Embodiments of a user station (STA) and methods for operating in a millimeter-wave basic service set (BSS) are generally described herein. In some embodiments, a STA transmits a request, using a first channel with a first bandwidth, for an allocation to communicate data on a second channel with a second bandwidth different from the first bandwidth. The request can include a directional multi-gigabit (DMG) traffic specification (TSPEC) element with a value representative of the second bandwidth. The STA may receive the allocation of the second bandwidth in an Extended Schedule element. The STA may transmit data on the second channel with the second bandwidth responsive to receiving the allocation.

20 Claims, 10 Drawing Sheets

Related U.S. Application Data

(60) Provisional application No. 61/875,842, filed on Sep. 10, 2013.

(51) Int. Cl.
*H04W 40/24* (2009.01)
*H04W 72/04* (2009.01)

(56) References Cited

U.S. PATENT DOCUMENTS

| | | |
|---|---|---|
| 2012/0063410 A1 | 3/2012 | Hong et al. |
| 2012/0155443 A1 | 6/2012 | Cordeiro |
| 2013/0051328 A1 | 2/2013 | Chandra |
| 2013/0088983 A1* | 4/2013 | Pragada ............... H04W 16/14 370/252 |
| 2013/0176993 A1 | 7/2013 | Trainin et al. |
| 2013/0252548 A1 | 9/2013 | Levy et al. |
| 2014/0328313 A1 | 11/2014 | Merlin et al. |
| 2016/0073429 A1 | 3/2016 | Oteri et al. |
| 2016/0337906 A1 | 11/2016 | Cordeiro |

FOREIGN PATENT DOCUMENTS

| | | |
|---|---|---|
| CN | 105453674 A | 3/2016 |
| CN | 108810997 A | 11/2018 |
| JP | 2016533135 A | 11/2017 |
| KR | 1020060106775 A1 | 10/2006 |
| KR | 101700169 B1 | 1/2017 |
| WO | WO-2013105923 A2 | 7/2013 |
| WO | WO-2015038175 A1 | 3/2015 |

OTHER PUBLICATIONS

"Chinese Application Serial No. 201380078757.6, Office Action dated May 31, 2018", w/English Translation, 14 pgs.
"U.S. Appl. No. 14/911,997, Corrected Notice of Allowance dated Dec. 13, 2017", 2 pgs.
"U.S. Appl. No. 14/911,997, Non Final Office Action dated May 15, 2017", 9 pgs.
"U.S. Appl. No. 14/911,997, Notice of Allowance dated Sep. 8, 2017",5 pgs.
"U.S. Appl. No. 14/911,997, Response filed Aug. 14, 2017 to Non Final Office Action dated May 15, 2017", 9 pgs.
"International Application Serial No. PCT/US2013/074153, International Preliminary Report on Patentability dated Mar. 24, 2016", 7 pgs.
"International Application Serial No. PCT/US2013/074153, International Search Report dated Jun. 3, 2014", 4 pgs.
"International Application Serial No. PCT/US2013/074153, Written Opinion dated Jun. 3, 2014", 5 pgs.
"Japanese Application Serial No. 2016-540871, Office Action dated Feb. 7, 2017", w/ English Translation, 8 pgs.
"Japanese Application Serial No. 2016-540871, Office Action dated Jun. 6, 2017", W/ English Translation, 6 pgs.
"Japanese Application Serial No. 2016-540871, Response filed May 1, 2017 to Office Action dated Feb. 7, 2017", w/ English Claims, 19 pgs.
"Japanese Application Serial No. 2016-540871, Response filed Sep. 5, 2017 to Office Action dated Jun. 6, 2017", w/English Claims, 11 pgs.
"Part 11:Wireless LAN Medium Access Control (MAC) and Physical Layer(PHY) Specification", Amendment 3:Enhancements for Very High Throughput in the 60GHz Band,IEEE Std 802.11ad-2012,IEEE Computer Society, (Dec. 28, 2012), 134-137,269-270.
Xiaoming, Peng, "MAC Protcol to Support Dynamic Bandwidth for 802.11 aj(60GHz)", IEEE 802.11-13/0433r1, IEEE, (Jul. 17, 2013).
U.S. Appl. No. 14/911,977, U.S. Pat. No. 9,872,206, filed Feb. 12, 2016, Methods and Apparatus for Dynamic Bandwidth Management in Millimeter Wave Systems.
"Chinese Application Serial No. 201380078757.6, Response filed Oct. 12, 2018 to Office Action dated May 31, 2018", w/ English Claims, 20 pgs.

* cited by examiner

CHANNEL MANAGEMENT FOR AN ENHANCED DIRECTIONAL MULTI-GIGABIT STATION

CROSS-REFERENCE TO RELATED APPLICATION

This application is a continuation of U.S. patent application Ser. No. 14/911,997, filed Feb. 12, 2016, now issued as U.S. Pat. No. 9,872,206, which is a 371 of International Application No. PCT/US2013/074153, filed on Dec. 10, 2013, and published as WO 2015/038175 on Mar. 19, 2015, which claims priority to U.S. Provisional Patent Application Ser. No. 61/875,842, filed Sep. 10, 2013, which are incorporated herein by reference in their entirety.

TECHNICAL FIELD

Embodiments pertain to wireless communications. More particularly, some embodiments relate to millimeter-wave (mmW) communications and bandwidth management.

BACKGROUND

Current Wireless Gigabit Alliance (WiGig) and Institute of Electrical and Electronics Engineers (IEEE) 802.11ad specifications define a 60 GHz system in which all the stations use the same basic channel bandwidth for both transmission and reception. Efforts are currently underway to extend WiGig and IEEE 802.11ad to allow other channelization options. Accordingly, there is an ongoing need to allow bandwidth configurations using other channelizations in millimeter-wave systems while maintaining compatibility with current IEEE 802.11ad systems.

DETAILED DESCRIPTION

Figure 1:
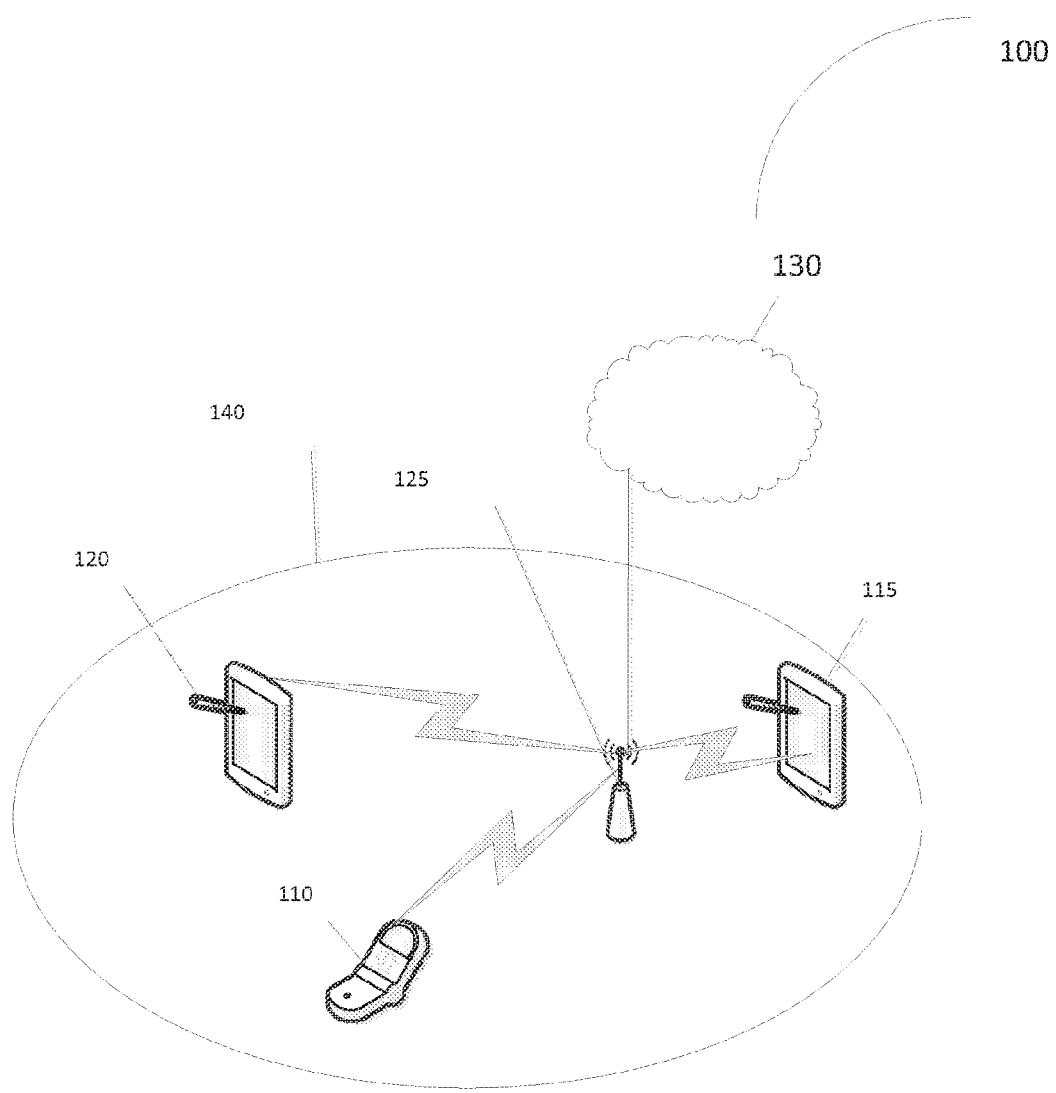
FIG. 1 illustrates a wireless network in accordance with some embodiments.

FIG. 1 illustrates a wireless network 100 in accordance with some embodiments. The wireless network 100 includes user wireless communication stations (STAs) 110, 115 and 120. The STAs 110, 115, and 120 may be, for example, laptop computers, smart phones, tablet computers, printers, machine-type devices such as smart meters, or any other wireless device with or without a user interface. In an example, the STAs 110, 115 and 120 have a wireless connection through a STA 125 to the wireless network 130. The wireless network 130 may represent an interconnection of a number of networks. For instance, the wireless network 130 may couple with a wide area network such as the Internet or an intranet.

The STA 125 may be a more stationary communication unit such as a wireless access point (AP) or a personal basic service set (PBSS) control point (PCP) and will hereinafter be referred to as the AP 125. The STAs 110, 115, and 120 can be within a range or service area 140 of the AP 125. In some embodiments, the STAs 110, 115 and 120 and the AP 125 can transmit and receive communications in accordance with specific communication standards, such as the IEEE 802.11 standards although STAs 110, 115 and 120 and the AP 125 may also be suitable to transmit and receive communications in accordance with other techniques.

In various embodiments, the wireless network 130 may be implemented according to Wireless Gigabit Alliance Wireless Gigabit ("WiGig") Specification Version 1.0, according to Institute of Electrical and Electronics Engineers (IEEE) 802.11ad or according to any predecessors, revisions, or variants thereof (collectively, "the WiGig/802.11ad Standards"). However, embodiments are not limited to WiGig/802.11ad networks.

In various embodiments, STAs 110, 115 and 120 may include directional multi-gigabit (DMG) stations (STAs) operative to communicate over the wireless network 130 according to the WiGig/802.11ad Standards. While FIG. 1 illustrates three STAs 110, 115 and 120, embodiments are not limited thereto. Embodiments can also include more APs 125 with additional service areas 140 that may overlap or partially overlap with each other.

Current systems define a standard bandwidth (CH_BW) for communications channels of a wireless network such as the wireless network 130 of FIG. 1, and STAs 110, 115, and 120 may communicate according to CH_BW. For example, some current systems may include WiGig/802.11ad networks that define a fixed channel bandwidth with a value equal to 2160 MHz, and STAs 110, 115, and 120 that communicate during the data transfer intervals (DTIs) of the beacon intervals communicate according that fixed channel bandwidth.

Various embodiments provide for the use of channel bandwidths differing from CH_BW in such systems. For example, some embodiments can provide increased throughput, at the possible cost of higher power consumption, by performing channel bonding to combine multiple standard-sized channels into a single larger channel. Conversely, various embodiments can limit power consumption or be used to comply with local regulatory requirements restricting the bandwidths of communications channels by performing channel splitting to divide a standard-sized channel into smaller channels.

Various embodiments, therefore, provide methods and apparatuses to enable dynamic bandwidth management (DBWM) selection and configuration of communications with variable channel bandwidths. These methods and apparatuses can operate in networks that communicate according to an IEEE 802.11aj standard or future versions thereof, or according to future versions of the IEEE 802.11ad standard or versions thereof, although embodiments are not limited thereto, while maintaining backwardly compatible with current IEEE 802.11ad systems and networks.

In embodiments, control transmissions during the beacon transmission interval (BTI), association beamforming training (A-BFT) and announcement transmission interval (ATI) are made using the basic channel bandwidth defined in IEEE 802.11ad to support interoperability between legacy STAs and STAs supporting variable channel bandwidth.

Intra-BSS DBWM

Some embodiments provide DBWM within a basic service set (BSS). As understood by those of ordinary skill in the art, a BSS can include PCP or AP 125 (FIG. 1), and associated STAs 110, 115 and 120.

Figure 2:
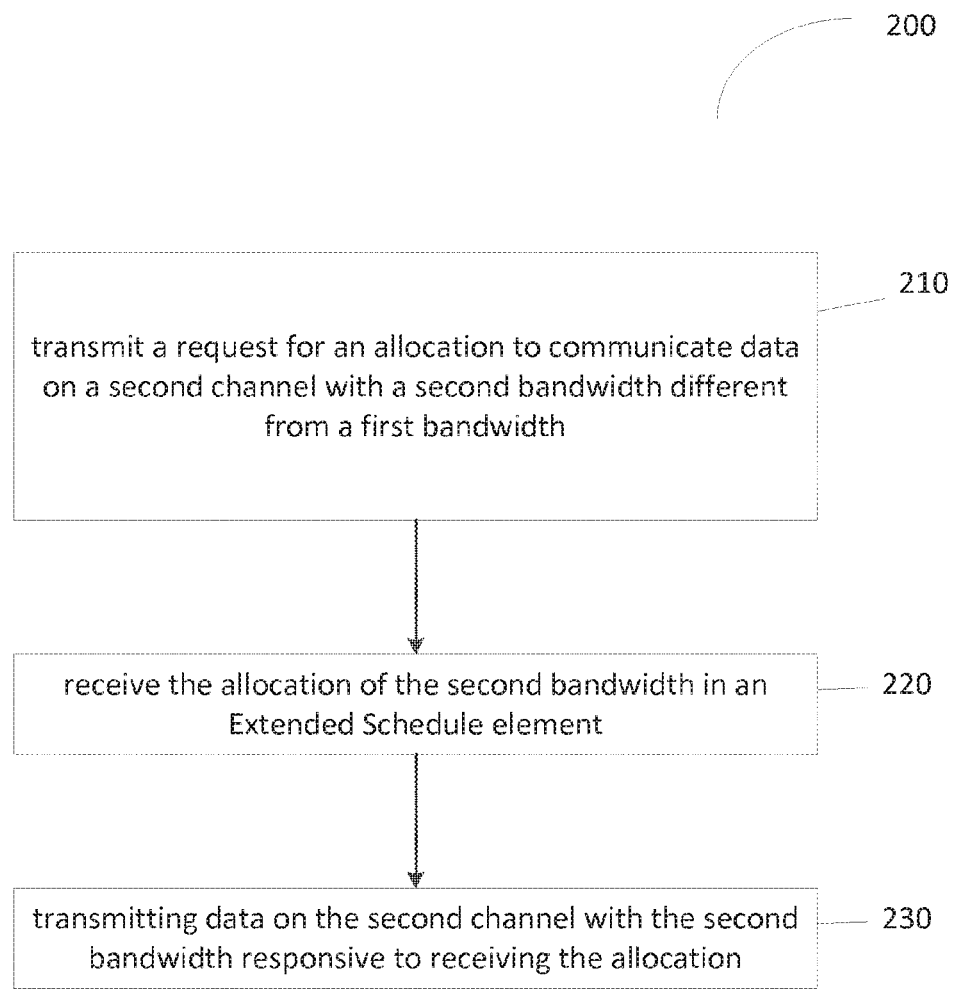
FIG. 2 is a flow chart of a method for intra-basic service set dynamic bandwidth management in accordance with some embodiments.

FIG. 2 is a flow chart of a method 200 for intra-BSS DBWM in accordance with some embodiments. The method 200 can be implemented by, for example, a STA 110 (FIG. 1) operating in a BSS on a first channel using a first bandwidth, for example a standard bandwidth CH_BW.

In operation 210, STA 110 transmits a request for an allocation to communicate data on a second channel with a second bandwidth different from the first bandwidth CH_BW. The STA 110 may transmit this request to a serving AP or PCP of the BSS. The STA 110 may transmit the request using a first channel with the first bandwidth. The first channel can be defined in accordance with a standard of the Institute of Electrical and Electronics Engineers (IEEE) 802.11ad family of standards and the second channel can be defined in accordance with a standard of the IEEE 802.11aj or later family of standards. The request can include a directional multi-gigabit (DMG) traffic specification (TSPEC) element with a value representative of the second bandwidth. The DMG TSPEC element can define a size of the second bandwidth relative to a size of the first bandwidth. The second channel can include an upper one-half of the first channel or a lower one-half of the first channel, or the second bandwidth can be a whole number multiple of the first bandwidth, although embodiments are not limited thereto. For example, the request can include a field similar to that shown in Table 1, below.

the bandwidth over which the forthcoming data communication is to take place.

Figure 3A:
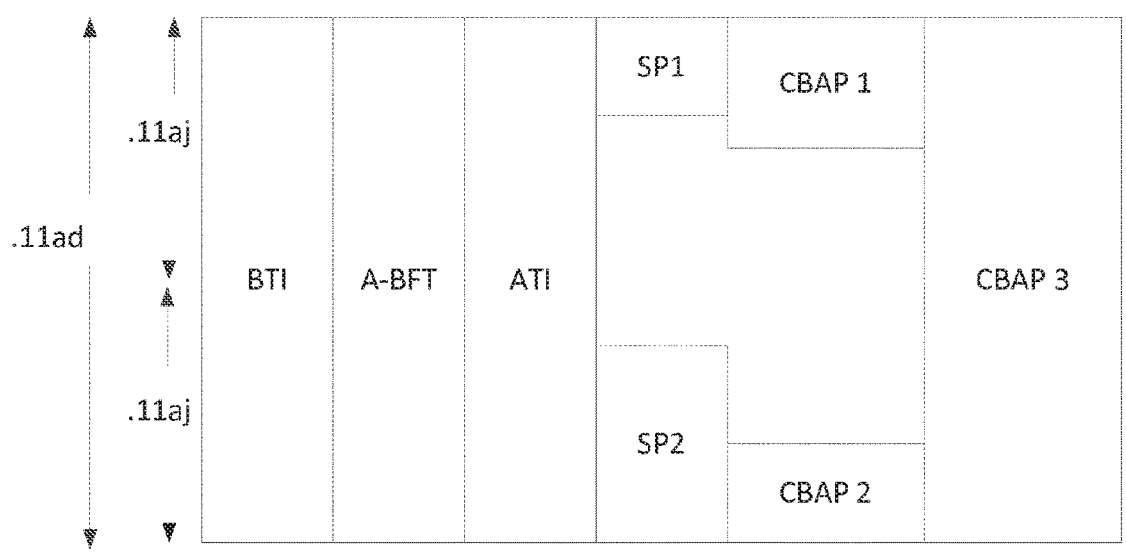
FIG. 3A illustrates allocations in a beacon interval in accordance with a first embodiment.
Figure 3B:
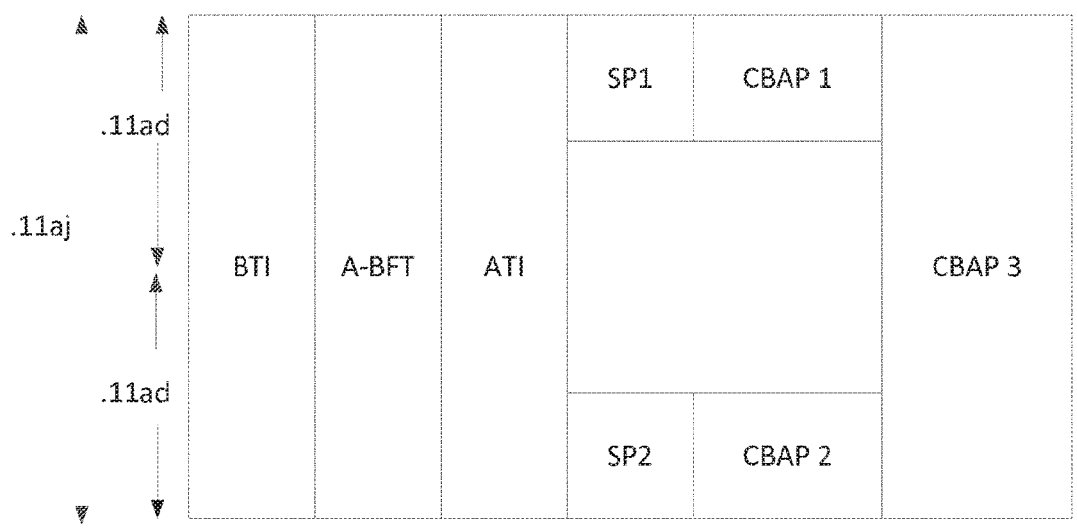
FIG. 3B illustrates allocations in a beacon interval in accordance with a second embodiment.

FIGS. 3A and 3B illustrate allocations in a beacon interval in accordance with some embodiments. As shown in FIG. 3A, as a result of allocations based on DMG TSPEC as described above with respect to operation 210 (FIG. 2), the beacon interval might contain both full-BW allocations, for example CBAP 3, and half-BW allocations, for example CBAP 1. However, embodiments are not limited thereto, and embodiments can include channel bonding such that full-BW CBAP 1 and double-BW CBAP 3 allocations are included as shown in FIG. 3B.

Referring again to FIG. 2, in operation 220, the STA 110 receives the allocation of the second bandwidth in an Extended Schedule element. The STA 110 may receive this allocation from a serving AP or PCP of the BSS.

In operation 230, the STA 110 transmits data on the second channel with the second bandwidth responsive to receiving the allocation. The STA 110 may transmit data to other STAs in the BSS, for example to STAs that support IEEE 802.11aj or later that are listening on the second bandwidth. The STA 110 receives control information in a BTI on the first channel, at least for purposes of retaining backward compatibility with legacy devices that are unable to receive control information on the second channel. For example, the STA 110 may receive each BTI, association beamforming training (A-BFT), and announcement transmission intervals (ATIs), received subsequent to the allocation, on the first channel for purposes of backward compatibility.

As will be described in more detail below with respect to inter-BSS embodiments, the BTI may include an indication as to whether the STA 110 should exclusively use the first channel for communications during a subsequent data transfer interval (DTI). As will also be described in more detail below with respect to inter-BSS embodiments, the STA 110 may receive additional control information on the first channel from a PCP or an AP associated with a neighboring

TABLE 1

Example DMG TSPEC element for bandwidth reallocation.

| Field Name | Field Size | Field Definition | Value |
|---|---|---|---|
| Bandwidth | 4 | Indicates the bandwidth over which the payload of the received PPDU (i.e., starting with the MAC header) is transmitted using as a reference the center frequency of the received PPDU. 0: 2.16 GHz, i.e., the 11ad channel containing the PPDU | 1: Upper 1.08 GHz (upper half of 11ad channel) 2: Lower 1.08 GHz (lower half of 11ad channel) 3: 11ad channel + upper 2.16 GHz 4: 11ad channel + lower 2.16 GHz 5: 11ad channel + upper 4.32 GHz 6: 11ad channel + lower 4.32 GHz 7: 11ad channel + upper 2.16 GHz + lower 2.16 GHz 8-15: reserved |

In another embodiment, channel bandwidth within a transmitted control or management frame can be codified using a channel number. For example, each value 1 thru 7 in Table 1 above could be associated with a unique and distinct channel number. As such, a new field indicating the channel number could be defined as part of a DMG TSPEC element, control frame or management. This field would then signal BSS. The STA 110 may refrain from transmitting during a time period based on the additional control information.

Figure 4A:
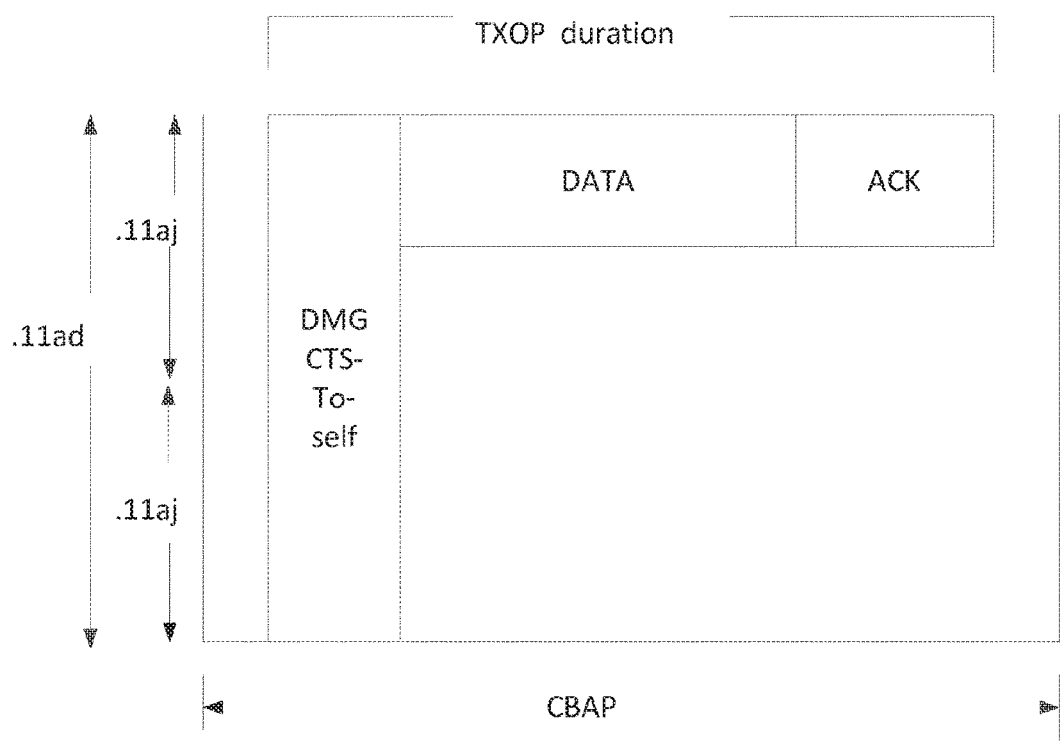
FIG. 4A illustrates allocation requests during a contention-based access period in accordance with a first embodiment.
Figure 4B:
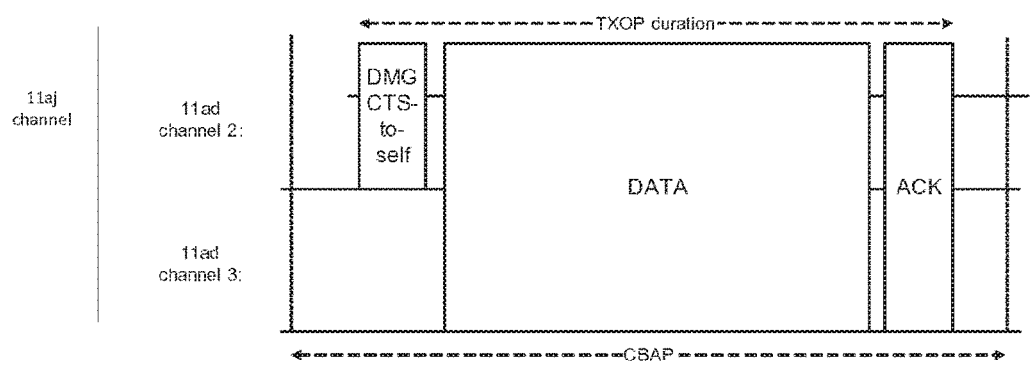
FIG. 4B illustrates allocation requests during a contention-based access period in accordance with a second embodiment.

FIGS. 4A and 4B illustrate allocation requests during a contention-based access period (CBAP) in accordance with embodiments. In some embodiments, whether or not STA 110 has requested allocations using DMG TSPEC as described above, STA 110 can use request to send (RTS) or DMG clear to send (CTS)-to-self to request allocation of channel bandwidths other than CH-BW. In these or other embodiments, STA 110 can determine that a legacy STA, for example STA 115, in the BSS is capable of receiving transmissions on the first channel, e.g., CH-BW, but not on the second channel on which STA 110 requested allocation. STA 110 can then request, using a coexistence technique, another allocation on a third channel with a third bandwidth different from the first bandwidth, by transmitting a value representative of the third bandwidth in a request RTS or DMG CTS-to-self frame.

The coexistence technique can include transmitting the request in the first channel, e.g., CH-BW, such that the request can be decoded by the legacy STA 115. For example, as shown in FIG. 4A, to enable DBWM within a CBAP, STA 110 can transmit a DMG CTS-to-self frame to signal channel BW information, using a channel width defined in IEEE 802.11ad, to obtain a transmit opportunity (TXOP) over a smaller channel BW. However, embodiments are not limited thereto, and STA 110 can transmit a DMG CTS-to-self frame to signal channel BW information, using a channel width defined in IEEE 802.11ad, to obtain a transmit opportunity (TXOP) over a larger channel BW, as shown in FIG. 4B.

As will be noted upon examination of FIG. 4A, various embodiments transmit a DMG CTS-to-self to establish a TXOP over the same channel as the allocated CBAP. In this way, embodiments allow nearby STAs, including legacy STAs to decode or understand reallocation requests. Nevertheless, embodiments are not limited thereto. For example, some embodiments can enhance spectrum efficiency to allow STAs, for example STA 110 and 115, which operate over the same full-BW channel to exchange data overlapping with an existing TXOP but in a different channel.

Figure 5:
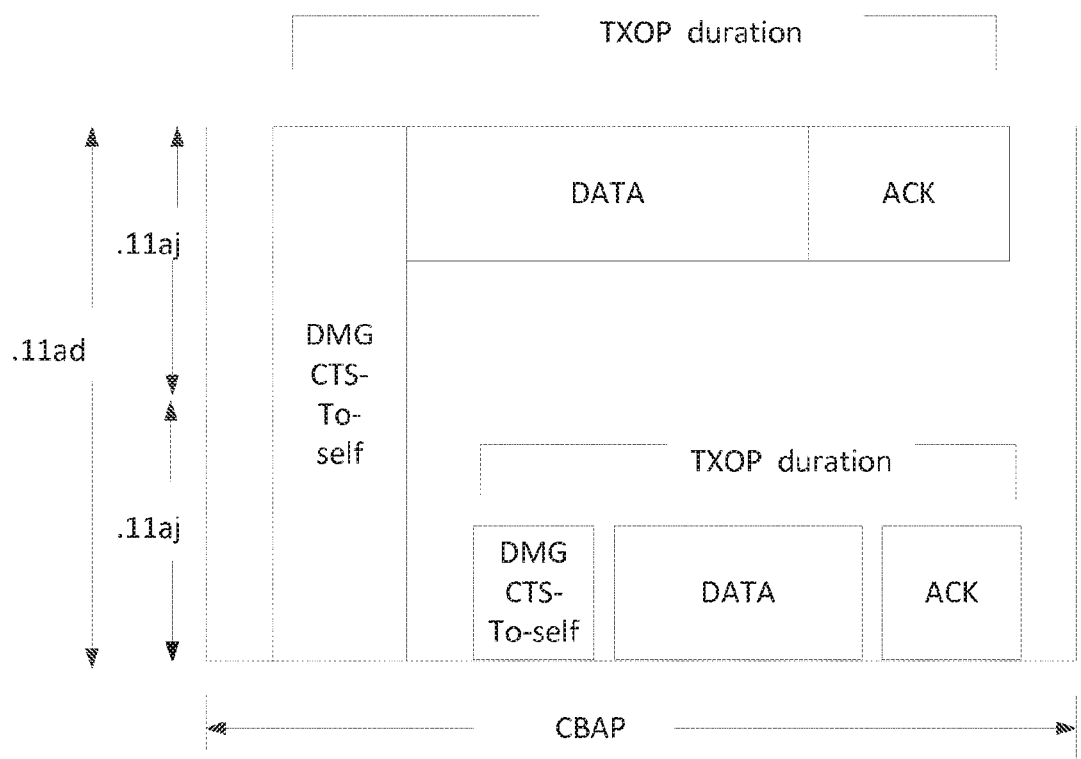
FIG. 5 illustrates overlapping transmission opportunities in accordance with some embodiments.

FIG. 5 illustrates such overlapping TXOPs in accordance with some embodiments. As shown in FIG. 5, a STA, for example STA 110, can transmit a DMG CTS-to-self within the smaller channel BW. This would allow the spatial reuse of the same TXOP by more than one disjoin pair of STAs, thus resulting in an increase in the aggregate throughput of the network given that multiple simultaneous transmissions take place over the same time period.

Inter-BSS DBWM

Some embodiments provide DBWM among multiple nearby BSSs that share the same CH_BW to allow the BSSs to dynamically coordinate a switch to a smaller channel BW. Some embodiments extend or enhance PCP/AP clustering mechanisms defined in a standard of an IEEE 802.11ad family of standards to provide inter-BSS DBWM. For example, some embodiments may enhance the PCP/AP clustering mechanism by transmitting BTIs, A-BFTs and ATIs on an IEEE 802.11ad channel. DTI allocations are independently managed by each PCP/AP, but are always synchronized to the S-PCP/S-AP. Allocations can be over different channel BWs.

Figure 6:
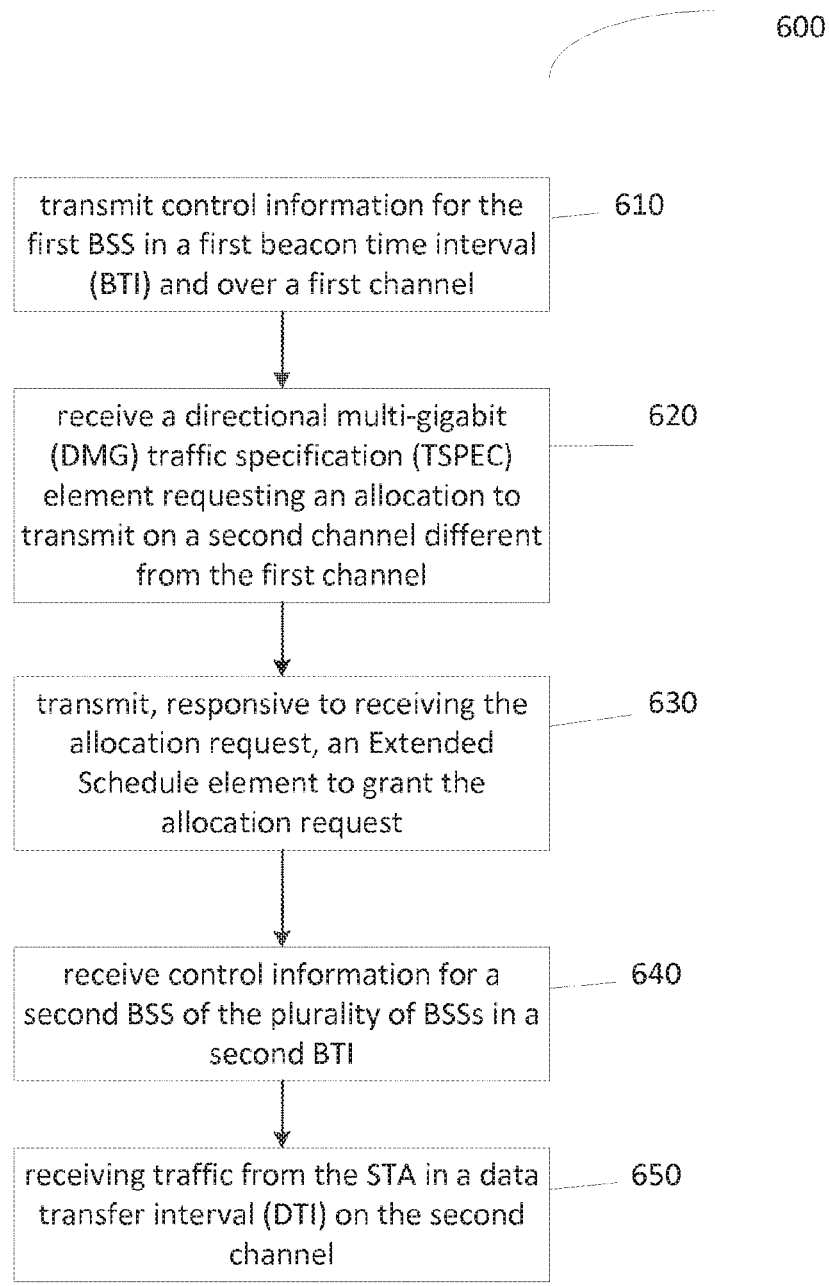
FIG. 6 is a flow chart of a method for inter-basic service set dynamic bandwidth management in accordance with some embodiments.

FIG. 6 is a flow chart of a method 600 for inter-BSS DBWM in accordance with some embodiments. The method 600 can be implemented by, for example, a STA 110 (FIG. 1) or an AP 125 (FIG. 1), or by any other stationary or non-stationary STA or PCP.

In operation 610, an AP 125, for example, transmits control information for a first BSS in a first BTI over a first channel. The first BTI can include an indication as to whether STAs 110, 115, and 120 in the first BSS are to communicate using exclusively the first channel or a different channel within the first channel.

In operation 620, the AP 125 receives, responsive to transmitting the control information and from a STA 110 in the first BSS, a DMG TSPEC element requesting an allocation to transmit on a second channel different from the first channel. The DMG TSPEC element can be similar to that described above with respect to FIG. 2.

In operation 630, the AP 125 transmits, responsive to receiving the allocation request, an Extended Schedule element to grant the allocation request.

In operation 640, the AP 125 receives control information for a second BSS of the plurality of BSSs in a second BTI. The AP 125 can receive this control information on the first channel and from another PCP or AP, after a time duration substantially equal to a cluster time offset from transmitting the control information. In operation 650, the AP 125 receives traffic from the STA in a data transfer interval (DTI) on the second channel. As described above, at least for purposes of backward compatibility with legacy devices, the AP 125 can suppress transmission of a BTI, association beamforming training (A-BFT), or announcement transmission interval (ATI) on the second channel and instead transmit these messages or data on the first channel, such that legacy devices can decode the messages.

Figure 7:
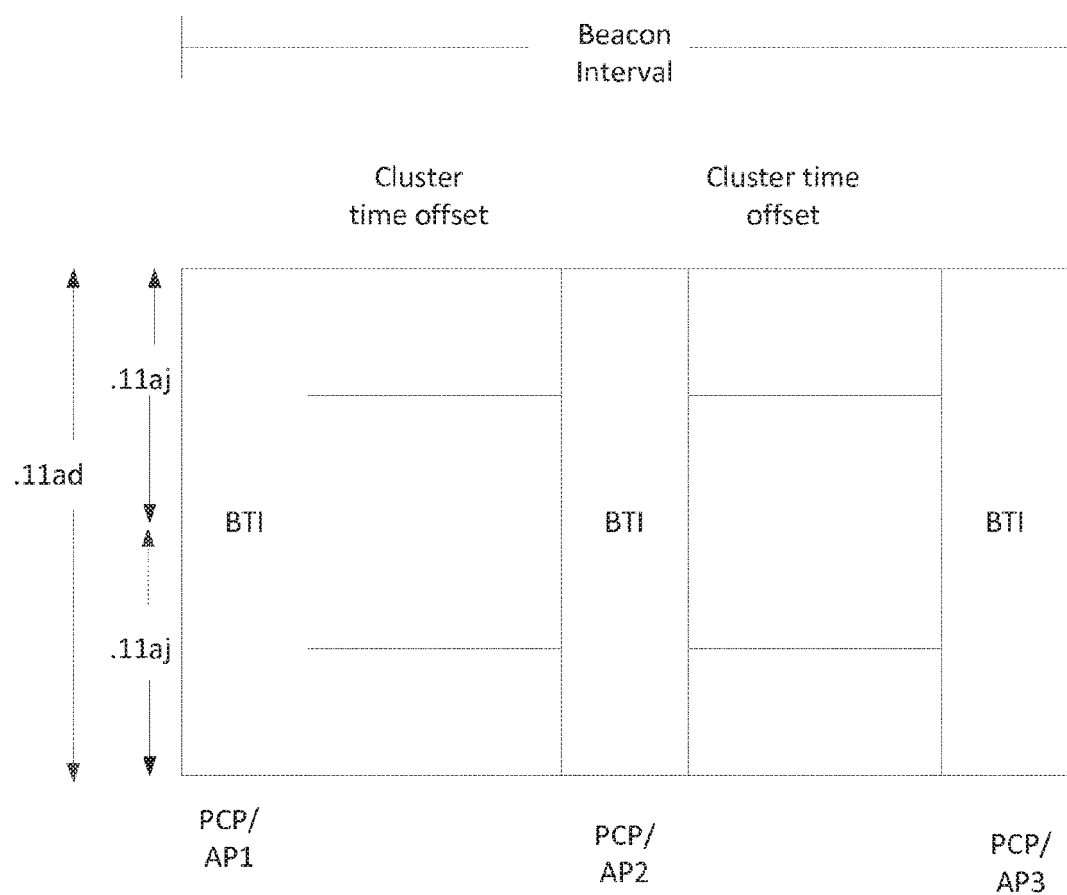
FIG. 7 illustrates an example of messaging for inter-basic service set dynamic bandwidth management in accordance with some embodiments.

FIG. 7 illustrates an example of messaging for inter-BSS DBWM in accordance with some embodiments. In the illustrative example, DBWM is performed for three overlapping BSSs, served by PCP/AP1, PCP/AP2, and PCP/AP3. Each BSS has its own BTI, A-BFT, and ATI, which is transmitted over an IEEE 802.11ad channel CH_BW, at least to maintain backward compatibility by allowing each STA in a BSS to participate in such control periods of the beacon interval. Within each DTI, allocations can cover different channel BWs. In some embodiments, therefore, multiple BSSs can share the same full CH_BW and use the smaller channel BW during actual data communication in the DTI.

Figure 8:
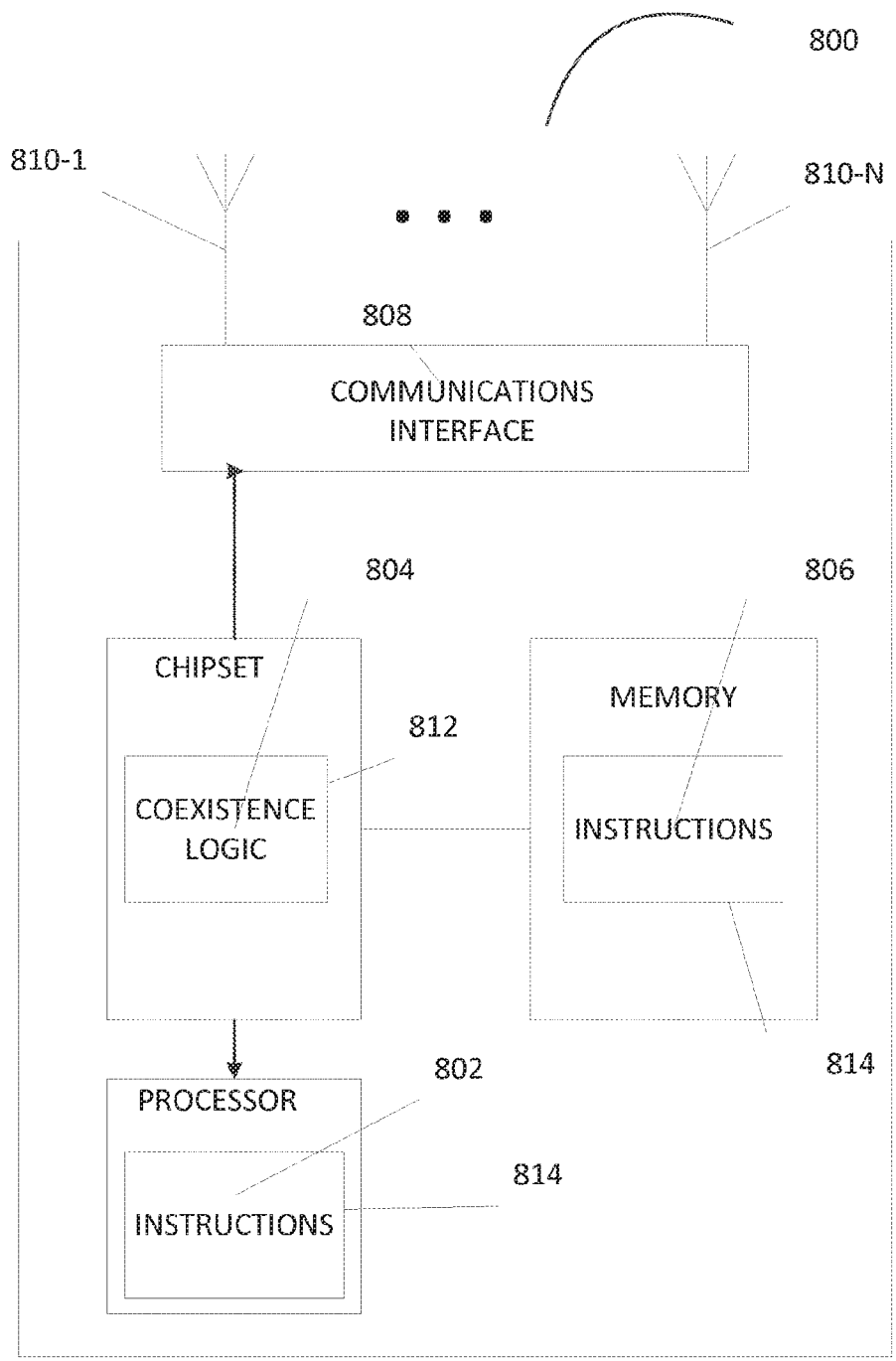
FIG. 8 is a functional block diagram of a communication station in accordance with some embodiments.

FIG. 8 is a functional block diagram of a STA 800, in accordance with some embodiments. The STA 800 may be suitable as a STA 110, 115, or 120 (FIG. 1) or as an AP 125. The STA 800 can support methods for operating in a wireless communication network, in accordance with embodiments. The STA 800 includes a processor 802, which uses a chipset 804 to access on-chip state memory 806, as well as a communications interface 808. In one embodiment the memory 806 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

In at least one embodiment, the communications interface 808 is, for example, a wireless Physical Layer (PHY), which operates according to a multiple input/multiple output (MIMO) operation. The communications interface 808 can transmit a request, using a first channel, for an allocation to communicate data on a second channel with a second bandwidth different from the first bandwidth. The request can include a directional multi-gigabit (DMG) traffic specification (TSPEC) element with a value representative of the second bandwidth. The first bandwidth may be defined in accordance with a standard of the Institute of Electrical and Electronics Engineers (IEEE) 802.11ad family of standards and the second bandwidth may be defined in accordance with a standard of the IEEE 802.11aj or later family of standards. The DMG TSPEC element may define a size of the second bandwidth relative to a size of the first bandwidth or use a unique and distinct channel number instead. The communications interface 808 can receive the allocation, responsive to the request, in an Extended Schedule element and thereafter transmit data on the second channel using the second bandwidth.

The chipset 804 can incorporate therein coexistence Logic 812 to, for example, implement backward compatibility as described above with respect to FIG. 2. In an embodiment, the chipset 804 provides MAC layer functionality.

Embodiments may be implemented in one or a combination of hardware, firmware, and software. Embodiments may also be implemented as instructions 814 stored on a non-transitory computer-readable storage device, which may be read and executed by at least one processor 802 to perform the operations described herein.

The processor 802 can determine that a legacy STA in the BSS is capable of receiving transmissions on the first channel but not on the second channel. Based on this determination, for example, the processor 802 can request, using a coexistence technique, an allocation on a third channel with a third bandwidth different from the first bandwidth, by transmitting a value representative of the third bandwidth in an RTS or a DMG CTS-to-self frame. The coexistence technique can include transmitting the request in the first channel such that the request can be decoded by the legacy STA.

In some embodiments, the communication interface 808 can receive each BTI, association beamforming training (A-BFT), and announcement transmission interval (ATI) on the first channel, at least for compatibility reasons as described above. The BTI can include an indication as to whether the STA should exclusively use the first channel, or a channel within the first channel, for communications during a subsequent data transfer interval (DTI). The communications interface 808 can receive at least one DTI of a second non-legacy STA in the BSS on a third channel different from the first channel.

The STA 800 can also perform functionalities of a PCP/AP as described above with respect to FIG. 7-8.

In some embodiments, the instructions 814 are stored on the processor 802 or the memory 806 such that the processor 802 and the memory 806 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 814, when executed on the STA 800, may cause the STA 800 to transmitting control information for a first BSS of a plurality of neighboring BSSs, in a first beacon time interval (BTI) and over a first channel. The BTI can include an indication as to whether STAs in the first BSS are to communicate exclusively on the first channel. The instructions can cause the STA 800 to receive, responsive to transmitting the control information, an allocation request from a user station (STA) in the first BSS to transmit on a second channel different from the first channel. The instructions can cause the STA 800 to transmit, responsive to receiving the allocation request, an Extended Schedule element to grant the allocation request. The instructions can cause the STA 800 to receive, on the first channel and from another PCP or AP, after a time duration substantially equal to a cluster time offset from transmitting the control information, control information for a second BSS of the plurality of BSSs in a second BTI. The STA 800 can receive traffic for the first BSS in a data transfer interval (DTI) on the second channel.

Although the STA 800 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements of the STA 800 may refer to one or more processes operating on one or more processing elements.

The STA 800 may include multiple transmit and receive antennas 810-1 through 810-N, where N is a natural number. Antennas 810-1 through 810-N may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 810-1 through 810-N may be effectively separated to take advantage of spatial diversity and the different channel characteristics that may result between each of antennas 810-1 through 810-N. In some MIMO embodiments, antennas 810-1 through 810-N may be separated by up to $\frac{1}{10}$ of a wavelength or more.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

ADDITIONAL NOTES & EXAMPLES

Example 1 may include subject matter (such as a method, means for performing acts, machine readable medium including instructions that, when performed by a machine cause the machine to performs acts, or an apparatus configured to perform), comprising transmitting a request, using a first channel with a first bandwidth, for an allocation to communicate data on a second channel with a second bandwidth different from the first bandwidth, the request including a directional multi-gigabit (DMG) traffic specification (TSPEC) element with a value representative of the second bandwidth; receiving the allocation of the second bandwidth in an Extended Schedule element; and transmitting data on the second channel with the second bandwidth responsive to receiving the allocation.

Example 2 may include, or may optionally be combined with the subject matter of Example 1 to further comprise determining that a legacy STA in the BSS is capable of receiving transmissions on the first channel but not on the second channel; and requesting, using a coexistence technique, another allocation on a third channel with a third bandwidth different from the first bandwidth, by transmitting a value representative of the third bandwidth in a request to send (RTS) or in a DMG clear to send (CTS)-to-self frame, the coexistence technique including transmitting the request in the first channel such that the request can be decoded by the legacy STA.

Example 3 may include, or may optionally be combined with the subject matter of Examples 1 and/or 2 to further comprise receiving, subsequent to receiving the allocation of the second bandwidth, control information in a beacon transmission interval (BTI) on the first channel.

Example 4 may include, or may optionally be combined with the subject matter of any of Examples 1-3, to optionally include an aspect wherein each BTI, association beamforming training (A-BFT), and announcement transmission interval (ATI) that is received subsequent to the allocation is received on the first channel.

Example 5 may include, or may optionally be combined with the subject matter of any of Examples 1-4, to optionally include an aspect wherein the BTI includes an indication as to whether the STA should exclusively use the first channel for communications during a subsequent data transfer interval (DTI).

Example 6 may include, or may optionally be combined with the subject matter of any of Examples 1-5, to further comprise receiving additional control information on the first channel from a personal basic service set control point (PCP) or an access point (AP) associated with a neighboring BSS; and refraining from transmitting during a time period based on the additional control information.

Example 7 may include, or may optionally be combined with the subject matter of any of Examples 1-6, to optionally include an aspect wherein the first channel is defined in accordance with a standard of the Institute of Electrical and Electronics Engineers (IEEE) 802.11ad family of standards and the second channel is defined in accordance with a standard of the IEEE 802.11aj or later family of standards, and the DMG TSPEC element defines a size of the second bandwidth relative to a size of the first bandwidth, which can be done through different methods including having a unique and distinctive channel number associated with each different channel bandwidth.

Example 8 may include, or may optionally be combined with the subject matter of any of Examples 1-7, to optionally include an aspect wherein the second channel includes an upper one-half of the first channel or a lower one-half of the first channel.

Example 9 may include, or may optionally be combined with the subject matter of any of Examples 1-6, to optionally include an aspect wherein the second bandwidth is a whole number multiple of the first bandwidth.

Example 1 may include subject matter (such as a method, means for performing acts, machine readable medium including instructions that, when performed by a machine cause the machine to performs acts, or an apparatus configured to perform), comprising transmitting a request, using a first channel with a first bandwidth, for an allocation to communicate data on a second channel with a second bandwidth different from the first bandwidth, the request including a directional multi-gigabit (DMG) traffic specification (TSPEC) element with a value representative of the second bandwidth; receiving the allocation of the second bandwidth in an Extended Schedule element; and transmitting data on the second channel with the second bandwidth responsive to receiving the allocation.

Example 2 may include, or may optionally be combined with the subject matter of Example 1 to further comprise determining that a legacy STA in the BSS is capable of receiving transmissions on the first channel but not on the second channel; and requesting, using a coexistence technique, another allocation on a third channel with a third bandwidth different from the first bandwidth, by transmitting a value representative of the third bandwidth in a request to send (RTS) or in a DMG clear to send (CTS)-to-self frame, the coexistence technique including transmitting the request in the first channel such that the request can be decoded by the legacy STA.

Example 3 may include, or may optionally be combined with the subject matter of Examples 1 and/or 2 to further comprise receiving, subsequent to receiving the allocation of the second bandwidth, control information in a beacon transmission interval (BTI) on the first channel.

Example 4 may include, or may optionally be combined with the subject matter of any of Examples 1-3, to optionally include an aspect wherein each BTI, association beamforming training (A-BFT), and announcement transmission interval (ATI) that is received subsequent to the allocation is received on the first channel.

Example 5 may include, or may optionally be combined with the subject matter of any of Examples 1-4, to optionally include an aspect wherein the BTI includes an indication as to whether the STA should exclusively use the first channel for communications during a subsequent data transfer interval (DTI).

Example 6 may include, or may optionally be combined with the subject matter of any of Examples 1-5, to further comprise receiving additional control information on the first channel from a personal basic service set control point (PCP) or an access point (AP) associated with a neighboring BSS; and refraining from transmitting during a time period based on the additional control information.

Example 7 may include, or may optionally be combined with the subject matter of any of Examples 1-6, to optionally include an aspect wherein the first channel is defined in accordance with a standard of the Institute of Electrical and Electronics Engineers (IEEE) 802.11ad family of standards and the second channel is defined in accordance with a standard of the IEEE 802.11aj or later family of standards, and the DMG TSPEC element defines a size of the second bandwidth relative to a size of the first bandwidth.

Example 8 may include, or may optionally be combined with the subject matter of any of Examples 1-7, to optionally include an aspect wherein the second channel includes an upper one-half of the first channel or a lower one-half of the first channel.

Example 9 may include, or may optionally be combined with the subject matter of any of Examples 1-8, to optionally include an aspect wherein the second bandwidth is a whole number multiple of the first bandwidth.

Example 10 may include subject matter (such as a method or means for performing actions), including transmitting control information for the first BSS in a first beacon time interval (BTI) and over a first channel; receiving, responsive to transmitting the control information and from a user station (STA) in the first BSS, a directional multi-gigabit (DMG) traffic specification (TSPEC) element requesting an allocation to transmit on a second channel different from the first channel; transmitting, responsive to receiving the allocation request, an Extended Schedule element to grant the allocation request; receiving, on the first channel and from another PCP or AP, after a time duration substantially equal to a cluster time offset from transmitting the control information, control information for a second BSS of the plurality of BSSs in a second BTI; and receiving traffic from the STA in a data transfer interval (DTI) on the second channel.

In example 11, the subject matter of Example 10 can optionally include an aspect wherein the first BTI includes an indication as to whether STAs in the first BSS are to communicate using only the first channel.

In example 12 the subject matter of examples 10-11 can optionally include suppressing transmission of a BTI, association beamforming training (A-BFT), or announcement transmission interval (ATI) on the second channel.

Example 13 may include subject matter (such as an apparatus, mobile apparatus, network device, communication apparatus or device, hardware, component, or component), including physical layer (PHY) circuitry to transmit a request, using a first channel, for an allocation to communicate data on a second channel with a second bandwidth different from the first bandwidth, the request including a directional multi-gigabit (DMG) traffic specification (TSPEC) element with a value representative of the second bandwidth, wherein the first bandwidth is defined in accordance with a standard of the Institute of Electrical and Electronics Engineers (IEEE) 802.11ad family of standards and the second bandwidth is defined in accordance with a standard of the IEEE 802.11aj or later family of standards and the DMG TSPEC element defines a size of the second bandwidth relative to a size of the first bandwidth; receive the allocation, responsive to the request, in an Extended Schedule element; and transmit data on the second channel using the second bandwidth responsive to receiving the allocation.

Example 14 may include subject matter (such as an apparatus, mobile apparatus, network device, communication apparatus or device, hardware, component, or component), which may optionally be in addition to Example 13, to optionally include a processor to determine that a legacy STA in the BSS is capable of receiving transmissions on the first channel but not on the second channel and, based on the determination, request, using a coexistence technique, an allocation on a third channel with a third bandwidth different from the first bandwidth, by transmitting a value representative of the third bandwidth in a request to send (RTS) or DMG clear to send (CTS)-to-self frame, the coexistence technique including transmitting the request in the first channel such that the request can be decoded by the legacy STA.

Example 15 may include subject matter (such as an apparatus, mobile apparatus, network device, communication apparatus or device, hardware, component, or component), which may optionally be in addition to Example 13-14, to optionally include wherein the PHY circuitry is further configured to receive each BTI, association beamforming training (A-BFT), and announcement transmission interval (ATI) on the first channel, and wherein the BTI includes an indication as to whether the STA should exclusively use the first channel for communications during a subsequent data transfer interval (DTI); and to receive at least one DTI of a second non-legacy STA in the BSS on a third channel different from the first channel.

What is claimed is:

1. An apparatus of an enhanced directional multi-gigabit (DMG) wireless communication station (STA) configured for operating in an enhanced DMG basic service set (BSS), the apparatus comprising: memory and processing circuitry, configured to:
   encode a request frame for transmission to an access point (AP), the request frame for a data channel allocation, the request including a directional multi-gigabit (DMG) traffic specification (TSPEC) element indicating a number of a first channel for the requested data channel allocation;
   configure the STA to transmit the request frame;
   determine, based on an extended schedule element received from the AP, if the first channel is successfully allocated to the station;
   decode control frames received during a beacon transmission interval (BTI) on a second channel or during an announcement transmission interval (ATI) on the second channel; and
   configure the station to transmit traffic on the allocated first channel, the configuring responsive to the determination that the first channel is allocated successfully to the STA for data traffic.

2. The apparatus of claim 1, processing circuitry further configured to decode control information received during an associated beamforming training interval (A-BFT) on the second channel.

3. The apparatus of claim 2, wherein the processing circuitry is further configured to:
   receive each BTI, association beamforming training (A-BFT), and announcement transmission interval (ATI) on the second channel, and wherein the BTI includes an indication as to whether the STA should exclusively use the second channel for communications during a subsequent data transfer interval (DTI); and
   receive at least one DTI of a second non-legacy STA in the BSS on a third channel different from the first or second channels.

4. The apparatus of claim 1, wherein the processing circuitry is further configured to maintain the allocation of the first data channel while decoding the control frames received on the second channel.

5. The apparatus of claim 1, wherein the processing circuitry is further configured to:
   determine that a legacy STA in the BSS is capable of receiving transmissions on the first data channel but not on the second channel, and
   in response to the determination, encoding a second request requesting another allocation on a third channel and configuring the STA to transmit the second request on the second channel.

6. The apparatus of claim 1, further comprising transceiver circuitry coupled to the processing circuitry.

7. The apparatus of claim 6, further comprising one or more antennas coupled to the transceiver circuitry.

8. A non-transitory computer readable medium comprising instructions that when executed cause one or more hardware processors of an enhanced directional multi-gigabit (DMG) wireless communication station (STA) configured for operating in an enhanced DMG basic service set (BSS), to perform operations comprising:
   encoding a request frame for transmission to an access point (AP), the request frame for a data channel allocation, the request including a directional multi-gigabit (DMG) traffic specification (TSPEC) element indicating a number of a first channel for the requested data channel allocation;
   configuring the STA to transmit the request frame;
   determine based on an Extended Schedule Element received from the AP if the first channel is successfully allocated to the station;
   decoding control frames received during a beacon transmission interval (BTI) on a second channel or during an announcement transmission interval (ATI) on the second channel; and configuring the station to transmit traffic on the allocated first channel, the configuring responsive to the determination that the first channel is allocated successfully to the STA for data traffic.

9. The non-transitory computer readable medium of claim 8, operations further comprising decoding control information received during an associated beamforming training interval (A-BFT) on the second channel.

10. The non-transitory computer readable medium of claim 8, the operations further comprising maintaining the allocation of the first channel while decoding the control frames received on the second channel.

11. An apparatus of an enhanced directional multi-gigabit (DMG) wireless communication access point (AP) configured for operating in an enhanced DMG basic service set (BSS), the apparatus comprising: memory and processing circuitry, configured to:
   decode a request frame from a station (STA), the request frame requesting a data channel allocation, the request including a directional multi-gigabit (DMG) traffic specification (TSPEC) element indicating a number of a first channel for the requested data channel allocation;
   encode an Extended Schedule Element to indicate the first channel is allocated to the station for data traffic;
   configure the access point to transmit the Extended Schedule Element to the station;
   decode traffic from the station received over the first channel; and
   configure the access point to transmit a control frame during a beacon transmission interval (BTI) on a second channel or during an announcement transmission interval (ATI) on the second channel.

12. The apparatus of claim 11, wherein the processing circuitry is further configured to configure the access point to transmit control information during an associated beamforming training interval (A-BFT) on the second channel.

13. The apparatus of claim 11, wherein the processing circuitry is further configured to maintain the allocation of the first channel to the STA while configuring the AP to transmit the control frames on the second channel.

14. The apparatus of claim 11, wherein the processing circuitry is further configured to refrain from transmitting BTIs, association beamforming training (A-BFT), and announcement transmission intervals (ATIs) on the first channel.

15. The apparatus of claim 11, further comprising transceiver circuitry coupled to the processing circuitry.

16. The apparatus of claim 15, further comprising one or more antennas coupled to the transceiver circuitry.

17. A non-transitory computer readable medium comprising instructions that when executed cause one or more hardware processors of an enhanced directional multi-gigabit (DMG) wireless communication access point (AP) configured for operating in an enhanced DMG basic service set (BSS) to perform operations comprising:
   decoding a request frame from a station (STA), the request frame requesting a data channel allocation, the request including a directional multi-gigabit (DMG) traffic specification (TSPEC) element indicating a number of a first channel for the requested data channel allocation;
   encoding an Extended Schedule Element to indicate the first channel is allocated to the station for data traffic;
   configuring the access point to transmit the Extended Schedule Element to the station;
   decoding traffic from the station received over the first channel; and
   configuring the access point to transmit a control frame during a beacon transmission interval (BTI) on a second channel or during an announcement transmission interval (ATI) on the second channel.

18. The non-transitory computer readable medium of claim 17, the operations further comprising configuring the access point to transmit control information during an associated beamforming training interval (A-BFT) on the second channel.

19. The non-transitory computer readable medium of claim 17, the operations further comprising maintaining the allocation of the first channel to the STA while configuring the AP to transmit the control frames on the second channel.

20. The non-transitory computer readable medium of claim 17, the operations further comprising refraining from transmitting BTIs, association beamforming training (A-BFT), and announcement transmission intervals (ATIs) on the first channel.

* * * * *

UNITED STATES PATENT AND TRADEMARK OFFICE
CERTIFICATE OF CORRECTION

PATENT NO. : 10,412,636 B2  
APPLICATION NO. : 15/862186  
DATED : September 10, 2019  
INVENTOR(S) : Carlos Cordeiro Page 1 of 1

It is certified that error appears in the above-identified patent and that said Letters Patent is hereby corrected as shown below:

In the Claims

In Column 12, Line 14, in Claim 2, after "1,", insert --the--

In Column 12, Line 38, in Claim 5, delete "channel," and insert --channel;-- therefor In Column 13, Line 6, in Claim 9, after "8,", insert --the--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*